Dec. 1, 1970 J. KLEIN 3,543,424

PORTABLE VIEWER FOR MICRO-FILM

Filed Nov. 16, 1967

INVENTOR
JESHAYAHU KLEIN
BY Pierre Lesperance
AGENT

United States Patent Office 3,543,424
Patented Dec. 1, 1970

3,543,424
PORTABLE VIEWER FOR MICRO-FILM
Jeshayahu Klein, 5153 Durocher St.,
Montreal 8, Quebec, Canada
Filed Nov. 16, 1967, Ser. No. 684,598
Int. Cl. G09f *11/295*
U.S. Cl. 40—31                            11 Claims

ABSTRACT OF THE DISCLOSURE

A battery-operated film viewer with a worm drive for the spools in which the worm can be displaced to operate either spool and advance or return the film, the motor circuit being closed by the aforementioned displacement. The film is viewed through a lens, either by ambient light or by an electric light. Ambient light enters the viewer through a translucent panel. The electric light is provided by a light bulb manually shiftable between an operative position intermediate the lens and the panel, and an inoperative out-of-the-way position, the light bulb electric circuit being automatically closed by movement of the light bulb into operative position. A manual drive for the spools is also provided.

---

This invention relates to a film viewer particularly for use in viewing microfilm.

Microfilm has become increasingly common in recent years as a convenient and inexpensive way of storing information for business and educational purposes.

The mechanically-operated viewers in use in libraries and business offices are relatively expensive and too bulky to be moved with ease.

Portable viewers are also known, but these are usually manually operated and they are therefore somewhat inconvenient.

It is the main object of the present invention to provide a small-size, low cost viewer in which the spools for the film are driven by a battery-operated motor, thereby providing speedy operation together with the convenience of portability.

A preferred embodiment of the invention is illustrated by way of example in the accompanying drawings, in which.

Figure 1:
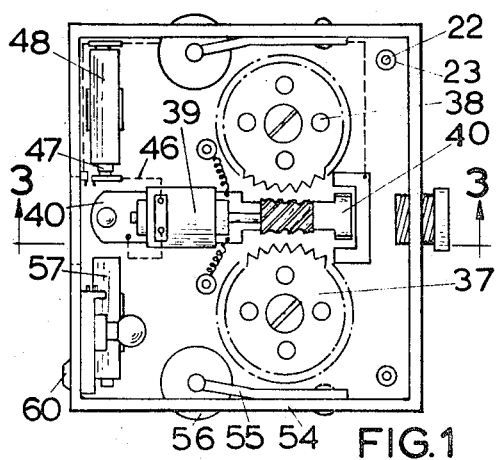
FIG. 1 is a plan of the viewer with cover and film magazine removed.
Figure 3:
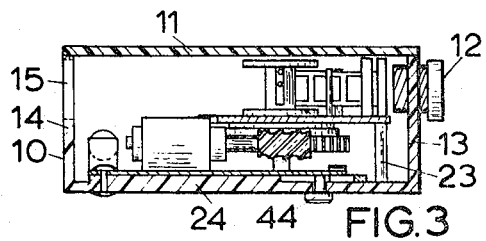
FIG. 3 is a section thereof along line 3—3 of FIG. 1.

Referring to the drawings in which like elements are indicated by the same reference numerals, the viewer comprises a relatively flat case 10 (FIGS. 1–3) with a removable cover 11 which may have a handle.

A magnifying lens 12 is mounted centrally in the front wall 13 of the case 10, and the rear wall 14 has, opposite the lens 12, a translucent panel 15 of frosted glass or plastic.

Figures 5, 6:
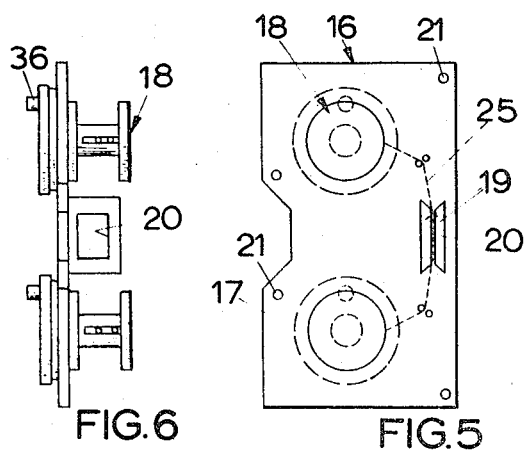
FIG. 5 is a plan of a film magazine adaptable to the viewer.
FIG. 6 is a side elevation of the film magazine.

A film magazine (FIGS. 3, 5, and 6) is provided, which comprises a base plate 17 on which are journalled a pair of film spools 18. The base plate 17 also carries two spaced uprights 19 which form a film slide. The uprights are apertured by windows 20.

The plate 17 has a plurality of holes 21 which fit pins 22 on the end of posts 23 projecting from the bottom 24 of the case 10 for mounting the film magazine 16. When the film magazine is mounted on the posts 23, the windows 20 of uprights 19 are aligned with the lens 12 and with the translucent panel 15, so that the film 25 can be viewed through the lens 12 by the ambient light coming through the panel 15.

Figure 7:
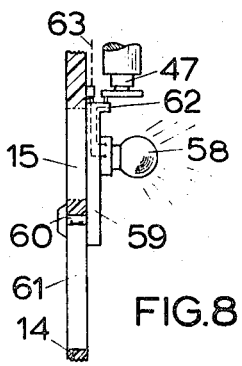
FIG. 7 is an exploded elevation of a film spool.

Each spool 18 (FIG. 7) comprises a bottom section 26 with a disc 27 and a hollow roll 28 which has an axial slot 29, and a top section 30 with a disc 31 and a shaft 32 fitting into the hollow roll 28 and having projecting pins 33 fitting into the slot 29. The end of the microfilm 25 is looped around the shaft 32 and passed through the slot 29 on either side of the pins 33.

The bottom section 26 of each spool is connected to a drive disc 34 disposed on the underside of the base plate 17. A felt disc 35 is interposed between the drive disc 34 and the base plate 17 for silent and smooth operation. The drive disc 34 has a drive pin 36 projecting from its underside. The connection of the spool section 26 with the drive disc 34 is by keyed shaft or the like (not shown), so that the spool 18 is rotated by the drive disc 34. The connection also serves to journal the spool 18 on the base plate 17 of the magazine 16.

A pair of toothed drive gears 37 is journalled on the bottom 24 of the case 10, each coaxial with one of the spools 18. Each gear 37 has a plurality of holes 38, one of which is penetrated by the drive pin 36 in the mounted position of the magazine 16, so that the spools 18 are in direct drive connection with the respective gears 37.

Figure 4:
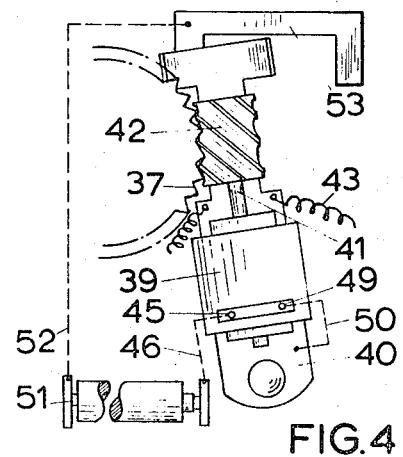
FIG. 4 is a fragmentary plan showing in detail the motor mount in drive position.

An electric motor 39 (FIGS. 1, 3, and 4) is mounted on a lever 40 pivoted at the rear of the case 10 on the bottom 24 thereof. The motor 39 has mounted on the drive shaft 41 thereof a worm gear 42 which is disposed between the drive gears 37. The lever 40 is normally held in a centered, neutral position by coil springs 43 on either side, connected to the bottom 24 of the case 10.

In this neutral position (FIG. 1), the worm gear 42 is out of engagement with either one of the drive gears 37. The lever 40 has a projecting handle 44 (FIG. 3) which passes through a slot in the bottom 24 of the case 10 and can be manually operated to shift the lever 40 and bring the worm gear 42 into driving engagement with either one of drive gears 37 (FIG. 4) so as to advance or reverse the film.

One terminal 45 of the motor 39 (FIGS. 1 and 4) is connected by a conductor 46 to one pole 47 of a battery 48 mounted on the case botom 24. The other terminal 49 of the motor 39 is connected by a conductor 50 to the lever 40 which is made of conducting material such as brass, and is suitably insulated. The other pole 51 of the battery is connected by a conductor 52 to a U-shaped switching element 53 which is suitably insulated and which is so disposed that the lever 40 comes in contact with either one of the arms thereof when the worm gear 42 engages either one of the drive gears 37. Thus, when the worm gear and motor assembly on lever 40 is in neutral position, the motor circuit is open, this circuit being closed in either driving position and actuating the motor and means to energize said light when in said first position.

Figure 2:
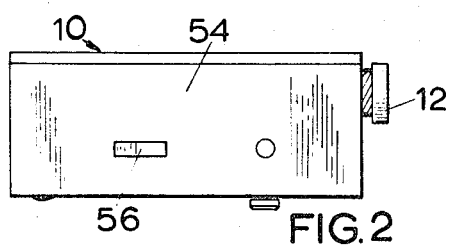
FIG. 2 is a side elevation of the viewer.

The side walls 54 (FIG. 1) of the case 10 have secured to the interior thereof leaf springs 55 which carry rollers 56 on the ends thereof. The rollers 56 are of frictional material such as rubber and are rotatably mounted on the leaf springs 55. The rollers 56 are normally held by the leaf springs 55 at a slight distance from the gears 37 and they project through suitable slots in the side walls 54 of the case 10 (FIG. 2). They can thus be manually depressed into engagement with the gears 37 and manually rotated to permit winding of the film by hand in case of failure of the motor 39 or of the battery 48.

A spare or auxiliary battery 57 may be provided in the case 10 on the opposite side of lever 40 from the battery 48.

Figure 8:
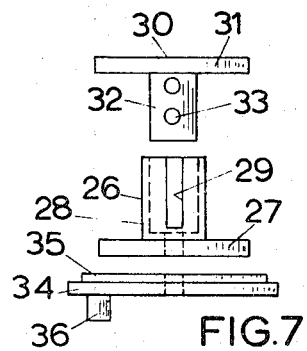
FIG. 8 is a fragmentary plan showing in detail an auxiliary light source.

A light bulb 58 (FIGS. 1 and 8) is mounted on a carrier 59 which has a bolt 60 projecting through the rear wall 14 of the case 10 and movable within a slot 61 in the wall 14. The carrier 59 may be slid by pushing on the head of bolt 60 and brought in front of the translucent panel 15. In this position, a contact 62 on the carrier 59 touches the pole 47 of the battery 48 and closes the circuit of the light bulb 58 which is completed by a conductor 63 going to the other pole 51 of the battery 48, thereby lighting the bulb 58. The bulb 58 is used when the ambient light is insufficient for film-viewing purposes.

What I claim is:

1. A film viewer comprising a case, a lens mounted in an aperture made in a first wall of said case, a translucent panel mounted in a second wall of said case spaced from and opposite said lens, means to transport the film across said lens between the same and said translucent panel, so that the film may be viewed through said lens while being illuminated by ambient light passing through said translucent panel, and an electric light source mounted in said case including a light bulb carrier movably mounted in said case for movement between a first position wherein a light bulb supported by said carrier is in the path extending between said panel and said lens, and a second position in which the light bulb is out of said path, means to manually shift said carrier between said two positions and means to energize said light when in said first position.

2. A film viewer as claimed in claim 1, further including an electric supply circuit for said light bulb switching means for said circuit closed by said carrier when the latter is in its first position and open when said carrier is in its second position.

3. A film viewer as claimed in claim 2, wherein said light bulb supply circuit includes a fixed contact adapted to engage a pole of a dry cell battery and a second contact secured to said carrier, whereby said two contacts engage each other when said carrier is in its first position.

4. A film viewer as claimed in claim 1, wherein said means to transport a film includes an electric motor, an electric supply circuit for said motor, a pair of film spools rotatably mounted on spaced parallel axes, each spool having a drive gear adjacent one end thereof, a gear connected to said motor and disposed between said drive gears, and means supporting the motor gear for movement into engagement with either drive gear to advance or reverse said film.

5. A film viewer as claimed in claim 4, further including switching means for the power supply circuit of said motor co-acting with said motor gear to close the motor circuit when the motor gear engages one or the other of said drive gears and to open said motor circuit when said motor gear is free of engagement with both said drive gears.

6. A film viewer as claimed in claim 5, wherein said means for supporting the motor gear include a lever pivotally mounted in said case and carrying said motor and, consequently, said motor gear, springs attached to both sides of said lever and to said case and resiliently holding said lever in neutral position with said motor gear free of engagement with both drive gears, manually-operable means to pivot said lever, said lever constituting one electric contact of said motor circuit swtching means.

7. A film viewer as claimed in claim 4, further including manually-operable rollers for driving said drive gears, said rollers spring urged out of engagement with said drive gears and being brought into engagement therewith by manual pressure.

8. A film viewer as claimed in claim 4, further including an electric supply circuit for said light bulb and switching means for said circuit closed by said carrier when the latter is in its first position and open when said carrier is in its second position.

9. A film viewer as claimed in claim 4, wherein said light bulb supply circuit includes a fixed contact adapted to engage a pole of a dry cell battery and a second contact secured to said carrier, whereby said two contacts engage each other when said carrier is in its first position.

10. A film viewer as claimed in claim 4, further including manually-operable rollers for driving said drive gears, said rollers spring urged out of engagement with said drive gears and being brought into engagement therewith by manual pressure, and further including an electric supply circuit for said light bulb and switching means for said circuit closed by said carrier when the latter is in its first position and open when said carrier is in its second position.

11. A film viewer as claimed in claim 10, wherein said light bulb supply circuit includes a fixed contact adapted to engage a pole of a dry cell battery and a second contact secured to said carrier, whereby said two contacts engage each other when said carrier is in its first position.

References Cited

UNITED STATES PATENTS

| | | | |
|---|---|---|---|
| 1,007,534 | 10/1911 | Clark | 40—31 X |
| 1,144,673 | 6/1915 | Wheeler. | |
| 1,450,555 | 4/1923 | Lepine | 40—86 |
| 2,657,487 | 11/1953 | Sprung | 40—86 |
| 2,720,045 | 10/1955 | Miller | 40—63 |
| 3,061,961 | 11/1962 | Cohen | 40—63 |
| 3,174,241 | 3/1965 | Rohan | 40—31 X |

FOREIGN PATENTS 628,751  9/1949  Great Britain.

EUGENE R. CAPOZIO, Primary Examiner

R. CARTER, Assistant Examiner

U.S. Cl. X.R.

40—86